US012776948B2

(12) United States Patent
Khandelwal et al.

(10) Patent No.: US 12,776,948 B2
(45) Date of Patent: Oct. 27, 2026

(54) AUTOMATIC DEPLOYMENT OF A MULTI-REGION CLOUD FLEET

(71) Applicant: Microsoft Technology Licensing, LLC, Redmond, WA (US)

(72) Inventors: Yash Khandelwal, Bothell, WA (US); Bartosz Henryk Paliswiat, Kirkland, WA (US); Yunus Mohammed, Bellevue, WA (US); Rajeesh Ramachandran, Bothell, WA (US); Rahul Sharma, Sammamish, WA (US)

( * ) Notice: Subject to any disclaimer, the term of this patent is extended or adjusted under 35 U.S.C. 154(b) by 0 days.

(21) Appl. No.: 19/081,665

(22) Filed: Mar. 17, 2025

(65) Prior Publication Data

US 2026/0280977 A1 Sep. 17, 2026

(51) Int. Cl.
*G06F 15/16* (2006.01)
*H04L 41/0806* (2022.01)
*H04L 41/5003* (2022.01)

(52) U.S. Cl.
CPC ...... *H04L 41/0806* (2013.01); *H04L 41/5003* (2013.01)

(58) Field of Classification Search
CPC ........................ H04L 41/0806; H04L 41/5003
See application file for complete search history.

(56) References Cited

U.S. PATENT DOCUMENTS

| | | | | |
|---|---|---|---|---|
| 12,639,110 | B2 * | 5/2026 | Zhang | G06F 9/4881 |
| 2009/0119233 | A1 * | 5/2009 | Dunagan | G06Q 50/06<br>705/412 |
| 2014/0282944 | A1 * | 9/2014 | Li | H04L 41/40<br>726/11 |
| 2015/0063558 | A1 * | 3/2015 | Chou | H04M 3/523<br>379/265.11 |
| 2016/0105489 | A1 * | 4/2016 | Llorca | H04L 47/762<br>709/226 |
| 2023/0309132 | A1 * | 9/2023 | Duan | G01S 7/003 |

OTHER PUBLICATIONS

Azure, Rajeesh, "New: Multi Region Compute Fleet—Dynamically distribute workloads across regions", Azure Compute Blog, https://techcommunity.microsoft.com/blog/azurecompute/new-multi-region-compute-fleet-dynamically-distribute-workloads-across-regions/4294969, Nov. 19, 2024, 03 Pages.
Extended European search report received in European Application No. 26163215.2, mailed on Jul. 30, 2026, 10 pages.

* cited by examiner

*Primary Examiner* — Razu A Miah

(57) ABSTRACT

Methods, apparatuses, and products for automatic deployment of a multi-region cloud fleet, including: receiving a request to generate a cloud fleet in a cloud computing environment, wherein the request comprises: data indicating a plurality of selectable regions for the cloud fleet and a resource allocation indicating an amount of computational resources to be allocated for the cloud fleet; determining, based at least on a capacity of the plurality of selectable regions, a cloud computing instance distribution across at least one region of the plurality of selectable regions and satisfying the resource allocation, wherein the cloud computing instance distribution describes, for each region of the at least one region, a corresponding group of cloud computing instances to be created for the cloud fleet; and creating, in each region of the at least one region, the corresponding group of cloud computing instances described in the cloud computing instance distribution.

17 Claims, 8 Drawing Sheets

AUTOMATIC DEPLOYMENT OF A MULTI-REGION CLOUD FLEET

BACKGROUND

Cloud computing platforms host the cloud fleets of users in large data centers distributed across the world in different regions. Each region is a geographic area that hosts one or more data centers for use by the cloud computing platform. These regions may differ in the types resources available to users, their pricing models, their available capacity, or in other ways. Some cloud fleets may not be limited to a single region. Instead, some cloud fleets may benefit from spanning multiple regions, including overall system reliability, serving a user base spread across a large geographic area, and the like.

When creating a cloud fleet, a user typically selects a region in which the cloud fleet should be created. Users may take various factors into consideration when selecting a region for their cloud fleet. For example, using a region closer to end users of the cloud fleet may result in less latency. As another example, certain workloads may benefit from certain types of resources available in certain regions. Due to these various factors, it may be difficult for a user to ultimately select a specific region that is most aligned with their goals. Region selection for cloud deployments may be further complicated when using multiple regions.

Existing implementations for creating cloud fleets require a user to specifically identify a region to support their cloud deployment and the specific configurations of instances to be created therein. If the identified region cannot support the requirements of the cloud fleet, be it due to lack of capacity or certain resources not being available in that region, the creation process will fail. This may lead to a negative user experience, forcing users to try different regions or different configurations of their cloud fleet until successfully created. Moreover, to create a multi-region fleet, this process must be repeated for each region, further complicating the creation process for users and leading to potential failures.

SUMMARY

According to embodiments of the present disclosure, various methods, apparatus, and products for automatic deployment of a multi-region cloud fleet are described herein. In some aspects, automatic deployment of a multi-region cloud fleet includes: receiving a request to generate a cloud fleet in a cloud computing environment, wherein the request comprises: data indicating a plurality of selectable regions for the cloud fleet and a resource allocation indicating an amount of computational resources to be allocated for the cloud fleet; determining, based at least on a capacity of the plurality of selectable regions, a cloud computing instance distribution across at least one region of the plurality of selectable regions and satisfying the resource allocation, wherein the cloud computing instance distribution describes, for each region of the at least one region, a corresponding group of cloud computing instances to be created for the cloud fleet; and creating, in each region of the at least one region, the corresponding group of cloud computing instances described in the cloud computing instance distribution. In some aspects, an apparatus may include a memory and one or more processing devices, operatively coupled to the memory, the one or more processing devices configured to perform similar steps. In some aspects, a computer program product comprising a computer readable storage medium may store computer program instructions that, when executed, perform similar steps.

DESCRIPTION OF EMBODIMENTS

Figure 1:
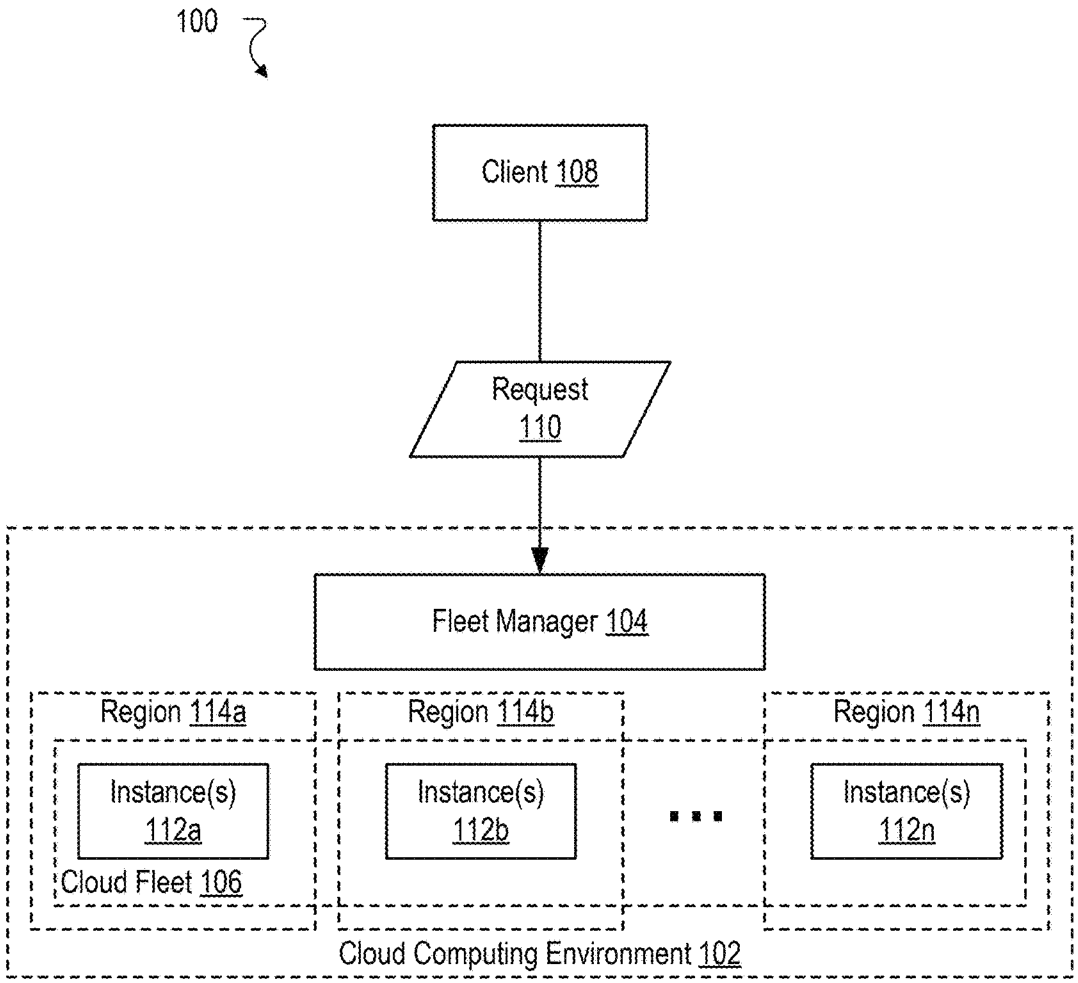
FIG. 1 sets forth a diagram of an example system of automatic deployment of a multi-region cloud fleet in accordance with some embodiments of the present disclosure.

Cloud computing platforms allow users, enterprises, or other groups of users (referred to hereafter as 'users') to run applications or other workloads using cloud computing instances, which may logically be grouped together as a cloud fleet. When creating a cloud fleet, a user typically selects a region in which the cloud fleet should be created. A region is a defined geographic area that includes one or more data centers whose resources will be used to support the cloud fleet. Users may take various factors into consideration when selecting a region for their cloud fleet. For example, where the cloud fleet supports latency-sensitive workloads, a region closer to the end users may be preferable so as to minimize latency when accessing the cloud fleet. As another example, certain regions may have different configurations of cloud computing instances available for use, which may affect region selection where certain configurations are preferable over others.

Cloud fleets may not be limited to a single region. Instead, some cloud fleets may be created across multiple regions, thereby affording these cloud fleets with performance benefits that may be otherwise unavailable to single region cloud fleets. For example, users accessing a multi-region cloud fleet may be routed to a data center in their nearest region to improve overall latency. As another example, multi-region cloud fleets may provide redundancy and disaster recovery should there be an outage in one region.

In some existing implementations, systems for creating a cloud fleet may require a user to specifically select a region for the cloud fleet. As different regions may differ in their available configurations, capacities, and pricing models, it may be difficult for a user to ultimately select a specific region that is most aligned with their goals. These difficulties are compounded when a user has to select multiple regions to support their cloud fleet. Moreover, existing implementations for creating a multi-region cloud fleet may require separate application programming interface (API) calls or commands for each region, with each API call or command specifically indicating the computational resources to be allocated for the fleet in that region. These factors may overcomplicate the process for creating and managing a cloud fleet, leading to a negative user experience.

To address these shortcomings, the approaches set forth herein provide a single system that may be used to create and manage a cloud fleet across one or more regions. A request, such as an API call, may include various resource requirements for a cloud fleet, such as amounts of resources for on-demand and spot cloud computing instances. The request may also indicate multiple selectable regions that may be used to support the cloud fleet. The resource requirements included in the request, the capacities of the selectable regions, and potentially other factors may then be used to determine how resources for the cloud fleet are distributed across one or more of the selectable regions. This allows for the cloud fleet to be created across potentially multiple regions without the need to specifically define what regions will be used and how resources are distributed across these regions.

Providing more features and options for cloud computing platforms may provide flexibility and customizability at the cost of increased complexity. Users are less likely to engage with cloud computing platforms that they deem to be overly complex or difficult to use, causing loss of revenue to the provider of the cloud computing platform. The approaches set forth herein provide approaches for automatic creation and management of a cloud fleet across potentially many regions using a single system. This improves the overall user experience, incentivizing users towards the cloud computing platform and increasing revenue for the provider. Moreover, as the particular regions and distributions of resources in those regions are dynamically determined based on various factors including capacity, this may improve the overall performance of the cloud fleet compared to other approaches that require specifically defined resource distributions.

Turning now to FIG. 1, shown is a diagram of an example system 100 for automatic deployment of a multi-region cloud fleet in accordance with some embodiments of the present disclosure. The system 100 includes a cloud computing environment 102. The cloud computing environment 102 is a set of hardware and software resources that allow for the creation and management of cloud-based computing resources. For example, the cloud computing environment 102 may support a particular cloud computing platform for creating and managing these cloud-based computing resources.

As shown, the cloud computing environment 102 includes multiple regions 114*a,b-n*. Each region 114*a,b-n* is a geographic area where cloud services are hosted. In other words, each region 114*a,b-n* is a geographic area having hardware and/or software resources to support operations of the cloud computing environment 102. For example, in some embodiments, each region 114*a,b-n* includes one or more data centers or another collection of computing resources for supporting the cloud computing environment 102. In some embodiments, each region 114*a,b*-n includes one or more availability zones. An availability zone is an isolated or independently operating set of resources such as a data center. Each availability zone provides some level of redundancy in the cloud computing environment 102 such that a failure of one availability zone may allow workloads in that availability zone to failover to another availability zone to maintain system uptime.

The system 100 also includes a fleet manager 104. Although the fleet manager 104 is shown as being executed within the cloud computing environment 102, readers will appreciate that, in some embodiments, the fleet manager 104 is executed in a separate computing device or computing environment that is communicatively coupled to the cloud computing environment 102 (e.g., via a network or other communications path). The fleet manager 104 is a process, service, and/or application that facilitates the creation and management of cloud-based computing resources in the cloud computing environment with respect to particular cloud fleets 106, described below. In other words, the fleet manager 104 may manage resources on the fleet level, and may itself be a component of a cloud manager managing resources across the cloud environment. For example, the fleet manager 104 may expose one or more interfaces, such as an application programming interface (API), that allows users to create and manage cloud-based computing instances in association with a particular account of the cloud computing environment 102 or cloud computing platform.

In some embodiments, to facilitate creation of a cloud fleet 106 in the cloud computing environment 102, the fleet manager 104 accepts, from a client 108, a request 110 to create a cloud fleet 106 in the cloud computing environment 102. A cloud fleet 106 is a logical grouping of cloud computing resources. For example, the cloud fleet 106 may include one of potentially many groupings of cloud computing resources associated with a particular user, account, and the like. In some embodiments, the cloud computing resources within a particular cloud fleet 106 includes interconnected or interoperating cloud computing resources, or cloud computing resources that are otherwise logically grouped to facilitate central management and configuration of these resources.

A cloud fleet 106 may include one or more instances 112*a,b-n* of cloud computing resources, including virtual machines, containers, virtual storage resources, or other cloud computing resources as can be appreciated. In some embodiments, these instances 112*a,b-n* include on-demand instances. On-demand instances are instances 112*a,b-n* of cloud computing resources that may be created (e.g., instantiated) in and deleted or removed from the cloud fleet 106 at will, such as in response to particular user commands or requests. In other words, an on-demand instance, once created, will remain until explicitly removed by a user. In some embodiments, accounts associated with on-demand instances are charged costs by a cloud service provider based on the length of time that the on-demand instance is executed.

In some embodiments, these instances 112*a,b-n* may include one or more spot instances. Spot instances are instances 112*a,b-n* of cloud computing resources similar to on-demand instances, differing in that spot instances may be automatically removed (e.g., deleted or deallocated) based on overall capacity of the cloud computing environment 102. As the cloud computing environment 102 has a limited amount of overall capacity (e.g., computing capacity) that may be potentially shared across multiple cloud fleets 106, the cloud computing environment 102 may require that some amount of capacity used by a spot instance to be freed for use elsewhere. Accordingly, in some embodiments, the cloud computing environment 102 can automatically remove spot instances from a cloud fleet 106 based on changes in capacity. Thus, in contrast to on-demand instances that will only be removed when explicitly removed by a user, spot instances may be automatically removed based on changes in capacity of the cloud computing environment 102 and potentially based on other metrics.

In some embodiments, a given cloud fleet 106 may be deployed within a single region 114*a,b-n* or span multiple regions 114*a,b-n*. In other words, in some embodiments, instances 112*a,b-n* of a cloud fleet 106 may be maintained in potentially multiple regions 114*a,b-n*. Such cloud fleets 106 are hereinafter referred to as multi-region cloud fleets 106. The use of a multi-region cloud fleet 106 may provide several advantages over cloud fleets 106 isolated to a single region 114*a,b-n*. For example, where users that interact with the cloud fleet 106 are spread over a large geographic area, the use of multiple regions 114*a,b-n* allow for network traffic from users to be routed to their nearest region 114*a,b-n*, reducing overall latency. As another example, a failure or outage in one region 114*a,b-n* of a multi-region fleet 106 may trigger a failover to a different region 114*a,b-n*, not just to another availability zone within the same region 114*a,b-n*. As a further example, distributing instances 112*a,b-n* and workloads across regions 114*a,b-n* reduces the amount of computational burden experiences by any given region 114*a,b-n* in supporting the cloud fleet 106.

A cloud service provider may offer various configurations for instances 112*a,b-n*. Each configuration may describe various attributes of an instance 112*a,b-n* having that configuration. Such attributes may include, for example, a number of vCPUs, what type of physical CPU will be used to support the instance, amounts of memory, amounts and types of local and/or remote storage (e.g., a number of discs, amounts of memory per disc, maximum input/output operations (IOPS) per second, maximum bandwidth), network resources (e.g., numbers of network interface cards (NICs), maximum bandwidth), and the like. Each configuration may correspond to different price points or pricing models, thereby allowing users to use, in their cloud fleet 106, virtual machine or other instance 112*a,b-n* configurations meeting the needs of their supported workloads, budgets, and other factors. In some embodiments, configurations are logically grouped into families or other groupings of configurations.

In some embodiments, the cloud computing environment 102 has different amounts of computational resources reserved or made available for each available configuration. Each configuration may therefore have some amount of allocated capacity in the cloud computing environment 102. Accordingly, in some embodiments, each configuration can have some amount of available capacity based on the amount of used capacity for instances 112*a,b-n* of that configuration. In some embodiments, each region 114*a,b-n* may similarly have different amounts of computational resources reserved for different configurations. Thus, each region 114*a,b-n* may have differing amounts of available capacity for different configurations. Moreover, in some embodiments, each region 114*a,b-n* may only offer or support certain configurations, thereby making some configurations of instances 112*a,b-n* unavailable in certain regions 114*a,b-n*.

In some embodiments, the request 110 includes a request 110 to create a cloud fleet 106 in a dynamically determined set of one or more regions 114*a,b-n*. The request 110 to create the cloud fleet 106 may include an API call or other command as can be appreciated. In some embodiments, the request 110 includes various parameters of the cloud fleet 106 that are used by the fleet manager 104 in creating the cloud fleet 106.

In some embodiments, the request 110 includes data indicating a plurality of selectable regions 114*a,b-n* in which the cloud fleet 106 can be created. In some embodiments, this data indicating the selectable regions 114*a,b-n* includes a listing of specific regions 114*a,b-n*. In some embodiments, this listing includes an unranked or unordered listing of regions 114*a,b-n*. In some embodiments, one or more of the regions 114*a,b-n* in the listing may be designated as a primary or preferred region 114*a,b-n* with the remaining regions 114*a,b-n* serving as secondary or alternative regions 114*a,b-n* for creating the cloud fleet 106. In some embodiments, rather than a specific listing of regions 114*a,b-n*, the data indicating the selectable regions 114*a,b-n* may include an indication of a geographic region (e.g., a "geography") that includes multiple regions 114*a,b-n*. Thus, the selectable regions 114*a,b-n* may be indicated in the request 110 by virtue of the request 110 indicating a geography that includes the selectable regions 114*a,b-n*. For example, assume regions 114*a,b-n* of North America West, North America South, and North America East included in the "North America" geography. To create a cloud fleet 106 in one or more of these regions 114*a,b-n*, the request 110 may include a listing of these regions 114*a,b-n* or an indication of the "North America" geography.

In some embodiments, the request 110 includes a resource allocation. A resource allocation describes amounts of computational resources to be allocated for the cloud fleet 106. In some embodiments, the resource allocation may be expressed as a number of instances 112*a,b*-n, a number of virtual Central Processing Unit (vCPU) cores, a number of graphics processing units (GPUs), or as amounts of other resources that may be allocated to the cloud fleet 106. For example, the resource allocation can include an on-demand instance requirement, an amount of computational resources required for on-demand instances. As another example, the resource allocation can include a spot instance requirement representing an amount of computational resources required for spot instances.

In some embodiments, the request 110 includes one or more configuration restrictions limiting a scope of the particular instance 112*a,b-n* configurations that may be used in the cloud fleet 106. In some embodiments, these configuration restrictions include a listing of selectable configurations. In some embodiments, the listing of selectable configurations included in the request 110 includes a listing or enumeration of configurations from which the fleet manager 104 may select the configurations to include in the cloud fleet 106. In some embodiments, the listing of selectable configurations includes a ranked or unranked (e.g., ordered or unordered) listing of selectable configurations.

In some embodiments, these configuration restrictions include conditions that must be satisfied by the instance 112*a,b-n* configurations used in the cloud fleet 106. For example, in some embodiments, these configuration restrictions may include a minimum, maximum, or range of acceptable values for particular attributes of an instance 112*a,b-n* configuration. Such attributes may include a number of vCPU cores per instance 112*a,b-n*, a financial cost per instance, and the like. As another example, in some embodiments, these configuration restrictions may include particular attributes that must be present in an instance 112*a,b-n* configuration, such as particular network configurations, particular hardware components, and the like.

In some embodiments, the request 110 includes an allocation strategy. An allocation strategy defines criteria or approaches used by the fleet manager 104 in selecting the particular configuration(s) for instances 112*a,b-n* in the cloud fleet 106 (e.g., subject to the configuration restrictions described above). In some embodiments, the allocation strategy is one of multiple predefined, selectable allocation strategies, with the request 110 including an indication of the particular allocation strategy to be used. In some embodiments, the request 110 includes separate allocation strategies for different types of instances 112*a,b-n* (e.g., for spot and on-demand instances 112*a,b-n*). In some embodiments, the request 110 includes an allocation strategy to be applied to multiple types of instances 112*a,b-n*.

In some embodiments, the allocation strategy includes a capacity-optimized allocation strategy. Under a capacity-optimized allocation strategy, instances 112*a,b-n* will be created using the selectable configuration with the most available capacity. In some embodiments, the allocation strategy includes a price-optimized allocation strategy. Under a price-optimized allocation strategy, instances will be created using the lowest cost configuration of the selectable configurations until a resource requirement has been satisfied. Should there not be enough available capacity for this lowest cost configuration to satisfy the corresponding resource requirement, additional instances may be created using the next-lowest cost configuration, and so forth until the resource requirement has been satisfied.

In some embodiments, the allocation strategy includes a price-capacity-optimized allocation strategy. A price-capacity optimized allocation strategy is similar to a capacity-optimized allocation strategy as described above, using price as a factor for selecting a particular configuration where multiple configurations have the same or similar available capacity. For example, where two configurations have the same, highest available capacity of the selectable configurations, the configuration having the lowest price will be used for creating the corresponding instances. The price-capacity-optimized allocation strategy may therefore use capacity as a primary factor and price as a secondary factor for selecting a particular configuration.

In some embodiments, the allocation strategy includes a priority ranking allocation strategy. Under a priority ranking allocation strategy, each potentially usable configuration is assigned a ranking. The highest ranked configuration may be preferentially selected. Should there not be enough available capacity for the highest ranked configuration to satisfy the corresponding resource requirement, the next highest ranked configuration may be used, and so forth, until the resource requirement has been satisfied, similar to the price-optimized allocation strategy as described above.

In some embodiments, these rankings are specified in the request 110. For example, in some embodiments, the request 110 may include an ordered, ranked listing of selectable configurations. In some embodiments, these rankings are dynamically calculated or determined based on various factors, including price, available capacity, and the like. In some embodiments, the ranking of a given configuration is based on whether the associated account for which the cloud fleet 106 is created has a reserved instance 112*a,b-n* on the given configuration. A reserved instance 112*a,b-n* is a contracted reservation of capacity for an instance 112*a,b-n* of the corresponding configuration for some amount of time (e.g., several years), which may come with a considerable price discount compared to non-reserved instances of that configuration. Accordingly, selectable configurations having a reserved instance may be assigned a higher ranking compared to other configurations up to the number of reserved instances 112*a,b-n*. In other words, reserved instance configurations may be preferentially selected under a priority ranking allocation strategy.

In some embodiments, the request 110 includes a distribution mode. A distribution mode describes how instances 112*a,b-n* of the cloud fleet 106 can be distributed across one or more regions 114*a,b-n*. In other words, the distribution mode describes a balance of instances 112*a,b-n* across at least one region 114*a,b-n* of the cloud fleet 106. In some embodiments, the distribution mode includes a single region 114*a,b-n* mode. Under a single region 114*a,b-n* mode, the cloud fleet 106 should be created in a single region 114*a,b-n* of the selectable regions 114*a,b-n* described above. In some embodiments, the distribution mode includes a mixed region 114*a,b-n* mode. Under a mixed region 114*a,b-n* mode, the cloud fleet 106 can be created in multiple regions 114*a,b-n* of the selectable regions 114*a,b-n*. In other words, under a mixed region 114*a,b*-n mode, the cloud fleet 106 can be the cloud fleet 106 can be created in a single region 114*a,b-n* or potentially multiple regions 114*a,b-n*, depending on the particular determinations made by the fleet manager 104. In some embodiments, the distribution mode includes a balanced region 114*a,b-n* mode. Under a balanced region 114*a,b-n* mode, instances 112*a,b-n* of the cloud fleet 106 should be distributed as evenly as possible across the selectable regions 114*a,b-n*.

The fleet manager 104 therefore determines, based on the request 110 and available capacity at each of the selectable regions 114*a,b-n*, a cloud computing instance 112*a,b-n* distribution for the cloud fleet 106. The cloud computing instance 112*a,b-n* distribution describes which instances 112*a,b-n* (e.g., how many instances 112*a,b-n* of which configuration(s)) will be created for the cloud fleet 106 in which regions 114*a,b-n* of the selectable regions 114*a,b-n*. In other words, the computing instance 112*a,b-n* distribution describes, for each region 114*a,b-n* of at least one region 114*a,b-n* of the selectable regions 114*a,b-n*, a corresponding group of instances 112*a,b-n* to be created for the cloud fleet 106. Readers will appreciate that the resulting cloud computing instance 112*a,b-n* distribution may use any of the selectable regions 114*a,b-n*, including combinations and subsets thereof, depending on the distribution mode indicated in the request 110.

The fleet manager 104 determines the cloud computing instance 112*a,b-n* distribution so as to satisfy the resource allocation while optimizing one or more optimization objectives. An optimization objective is a value that may be used when evaluating a possible cloud computing instance 112*a, b-n* distribution. The optimization objective is optimized by minimizing or maximizing that value. Accordingly, the fleet manager 104 determines the cloud computing instance 112*a, b-n* distribution so as to minimize or maximize some optimization objective while also satisfying the resource allocation. Readers will appreciate that the cloud computing instance 112*a,b-n* distribution may be generated to adhere to other criteria, such as allocation strategies, distribution modes, and the like.

The optimization objectives may include various values as can be appreciated. For example, in some embodiments, the optimization objective may include an operational cost associated with the cloud fleet 106 (e.g., according to some cloud computing instance 112*a,b-n* distribution), such as a projected or estimated operational cost. Such an operating cost may include or be based on fees for instances 112*a,b-n*, storage, data ingress or egress, or other factors. In this example, the resulting cloud computing instance 112*a,b-n* distribution may include a distribution that satisfies the resource allocation at minimal operating cost. As another example, in some embodiments, the optimization objective may include a latency, such as a projected or estimated latency, to one or more end users that may access the cloud fleet 106. As a further example, in some embodiments, the optimization objective may include available capacity in a particular region 114*a,b-n*. For example, a distribution may preferentially allocate instances 112*a,b-n* to regions 114*a, b-n* with greater amounts of available capacity, incentivizing the distribution of computational burden to regions 114*a,b-n* under less load. In some embodiments, the optimization objective may include a value calculated as a function of multiple values as described above. For example, an objective function may calculate an optimization objective as a function of multiple other values. Readers will appreciate that the example optimization objectives are merely illustrative and that other optimization objectives are also contemplated within the scope of the present disclosure.

In some embodiments, the optimization objectives may be included in the request 110. For example, a user may indicate that a cloud fleet 106 should be created that minimizes operational cost, latency, or other factors. In some embodiments, the optimization objectives may be defined with respect to a particular account or subscription associated with the cloud fleet 106. In some embodiments, the optimization objectives may be predefined by the fleet manager 104. In some embodiments, the optimization objectives may include default optimization objectives that may be overridden by optimization objectives specified in the request 110 and/or otherwise defined. For example, in some embodiments, operational cost may be used as a default optimization objective unless otherwise specified.

As is set forth above, in some embodiments, the request 110 may include various criteria or restrictions that may be used by the fleet manager 104 to determine the cloud computing instance 112*a,b-n* distribution. These criteria or restrictions may include constraints for limiting the scope of usable instance 112*a,b-n* configurations, allocation strategies, distribution modes, and the like. In some embodiments, additional restrictions may also be used by the fleet manager 104 that may not be explicitly defined in the request 110. In some embodiments, these restrictions are defined with respect to an account associated with the cloud fleet 106 (e.g., as a preference or selectable parameter). In some embodiments, these restrictions are defined with respect to a subscription or service tier for this account.

In some embodiments, the fleet manager 104 applies one or more configuration restrictions. A configuration restriction prevents certain configurations from being used in a cloud fleet 106 or in particular regions 114*a,b-n* of a cloud fleet 106. For example, an account subscription can include a configuration restriction that certain configurations may not be used at all. As another example, an account subscription can include a configuration restriction that certain configurations may not be used in certain availability zones. In some embodiments, the fleet manager 104 can apply one or more vCPU quotas. A vCPU quota is the maximum number of vCPUs that may be used for instances 112*a,b-n* of a particular grouping or family of configurations. The vCPU quota may be defined with respect to a particular region 114*a,b-n* or with respect to the cloud computing environment 102 as a whole. As a further example, in some embodiments, the fleet manager 104 applies one or more region 114*a,b-n* restriction. A region 114*a,b-n* restriction prevents certain regions 114*a,b-n* for being used for a cloud fleet 106. Such region 114*a,b-n* restrictions may be defined with respect to a particular subscription or account, with respect to particular groups of users (e.g., users associated with a particular geography or organization), or otherwise defined.

The fleet manager 104 then generates the cloud fleet 106 based on the determined distribution. In other words, the fleet manager 104 creates, in each determined region 114*a, b-n*, the numbers of instances 112*a,b-n* of the determined configurations. Readers will appreciate that the approaches set forth above provide several advantages for generating cloud fleets 106. For example, the fleet manager 104 allows for a cloud fleet 106 to be created in one or more regions 114*a,b-n* using a single API and request, in contrast to some existing implementations that require multiple steps to create instances 112*a,b-n* in each region 114*a,b-n* individually. As another example, these approaches allow for a particular region 114*a,b-n* or regions 114*a,b-n* to be selected for use based on various optimization objectives, in contrast to existing solutions where a specific region 114*a,b-n* for use must be selected.

Figure 2:
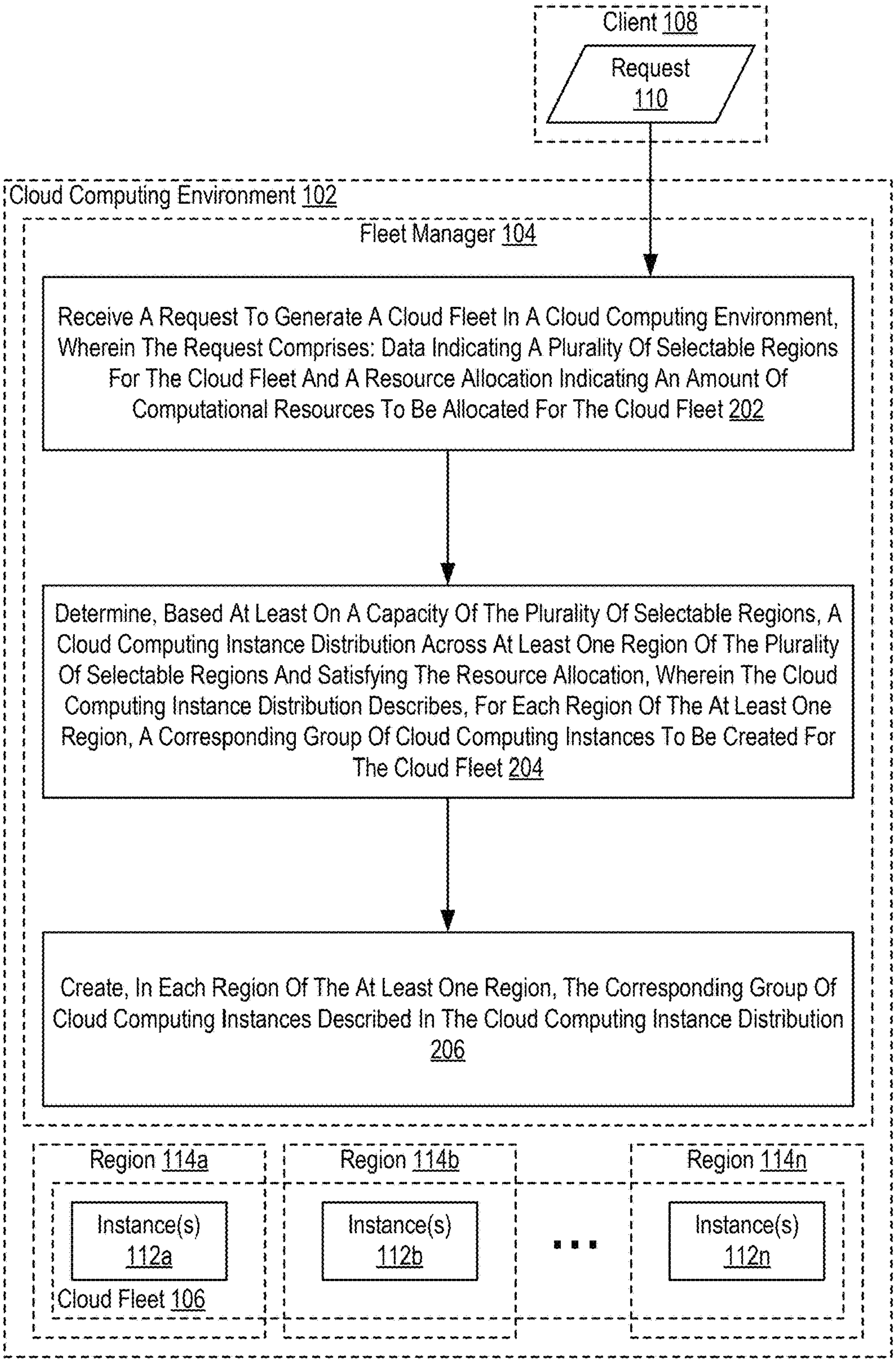
FIG. 2 sets forth a flow chart illustrating an example method of automatic deployment of a multi-region cloud fleet in accordance with some embodiments.

For further explanation, FIG. 2 sets forth a flowchart of another example method of automatic deployment of a multi-region cloud fleet in accordance with some embodiments of the present disclosure. The method of FIG. 2 may be performed, for example, by a fleet manager 104 of a cloud computing environment 102 as described in FIG. 1. The method of FIG. 2 includes receiving 202 a request 110 (e.g., from a client 108) to generate a cloud fleet 106 in a cloud computing environment 102, wherein the request 100 comprises: data indicating a plurality of selectable regions 114*a,b-n* for the cloud fleet 106 and a resource allocation indicating an amount of computational resources to be allocated for the cloud fleet 106. The plurality of selectable regions 114*a,b-n* are those regions 114*a,b-n* in which instances 112*a,b-n* of the cloud fleet 106 may be deployed as determined by the fleet manager 104. As will be described in further detail below, the resulting cloud fleet 106 may be isolated within one of the selectable regions 114*a,b-n* or may span multiple of the selectable regions 114*a,b-n*.

In some embodiments, the data indicating the plurality of selectable regions 114*a,b-n* includes a listing or enumeration of specific regions 114*a,b-n*. In some embodiments, this listing may designate a particular region 114*a,b-n* as a primary or preferred region 114*a,b-n*. In some embodiments, this listing may include an unordered or unranked listing of regions 114*a,b-n*. In some embodiments, the data indicating the plurality of selectable regions 114*a,b-n* may include an identifier of one or more geographies. A geography is a geographic area that itself includes multiple regions 114*a, b-n*. Accordingly, the selectable regions 114*a,b-n* may include those regions 114*a,b-n* included in the one or more identified geographies.

The resource allocation describes the amounts of computational resources to be allocated for the cloud fleet 106. In some embodiments, the resource allocation may be expressed as a number of instances 112*a,b-n*. In some embodiments, the resource allocation may be expressed as some unit of resources to be satisfied by the instances 112*a,b-n* of the cloud fleet 106. For example, the resource allocation may be expressed as a number of vCPU cores, numbers of GPUs, and the like. In some embodiments, the resource allocation may include subcomponents for different types of resources. For example, the resource allocation may include an amount of resources for on-demand instances, an amount of resources for spot instances, and the like.

In some embodiments, the request 110 also includes other attributes or criteria for generating the cloud fleet 106. Such attributes or criteria may include constraints that limit the scope of usable resource configurations (e.g., instance 112*a, b-n* configurations) in particular regions 114*a,b-n* or in the cloud fleet 106 as a whole. Such attributes may also include an allocation strategy defining how particular configurations are selected for inclusion in the cloud fleet 106. Such attributes may further include a distribution mode describing a balance of resources in the cloud fleet 106.

The method of FIG. 2 also includes determining 204, based at least on a capacity of the plurality of selectable regions, a cloud computing instance 112*a,b-n* distribution across at least one region 114*a,b-n* of the plurality of selectable regions 114*a,b-n* and satisfying the resource allocation, wherein the cloud computing instance 112*a,b-n* distribution describes, for each region 114*a,b-n* of the at least one region 114*a,b-n*, a corresponding group of cloud computing instances 112*a,b-n* to be created for the cloud fleet 106. Particularly, the cloud computing instance 112*a, b*-n distribution describes how many of which instance 112*a,b-n* configuration(s) will be created in each of one or more of the selectable regions 114*a,b-n*. In other words, the fleet manager 104 not only determines what configurations and how many instances 112*a,b-n* to use in the cloud fleet 106, but also determines which region(s) 114*a,b-n* should be used to support groups if instances 112*a,b-n* of the cloud fleet 106.

In some embodiments, determining 204 the cloud computing instance 112*a,b-n* distribution may include generating and evaluating multiple candidate distributions (e.g., cloud computing instance 112*a,b-n* distributions) that satisfy the resource allocation. Each candidate distribution may describe different distributions of instances 112*a,b-n* across different regions 114*a,b-n*. Each candidate distribution may be generated based on various constraints as described herein, based on defined allocation strategies, and/or based on other criteria. A particular candidate distribution may then be selected as the cloud computing instance 112*a,b-n* distribution based on various criteria, including optimizing some optimization objective as will be described in further detail below.

Determining 204 the cloud computing instance 112*a,b-n* distribution is based on the capacity of the selectable regions 114*a,b-n* in that each selectable region 114*a,b-n* must be evaluated to determine what resources (e.g., what instances 112*a,b-n*) can be created based on their current capacity. In some embodiments, the cloud computing instance 112*a,b-n* distribution may be determined 204 based on capacity in that a given candidate distribution may be evaluated higher where it allocates resources to regions 114*a,b-n* with lower capacity utilization.

The method of FIG. 2 also includes creating 206, in each region 114*a,b-n* of the at least one region 114*a,b-n*, the corresponding group of cloud computing instances 112*a,b-n* described in the cloud computing instance 112*a,b-n* distribution. In other words, after determining how many instances 112*a,b-n* of what configurations should be created in which of the selectable regions 114*a,b-n*, the fleet manager 104 creates the cloud fleet 106 accordingly. Thus, the resulting cloud fleet 106 satisfies the resource requirement and is distributed across an optimally selected set of region (s) 114*a,b-n*.

Figure 3:
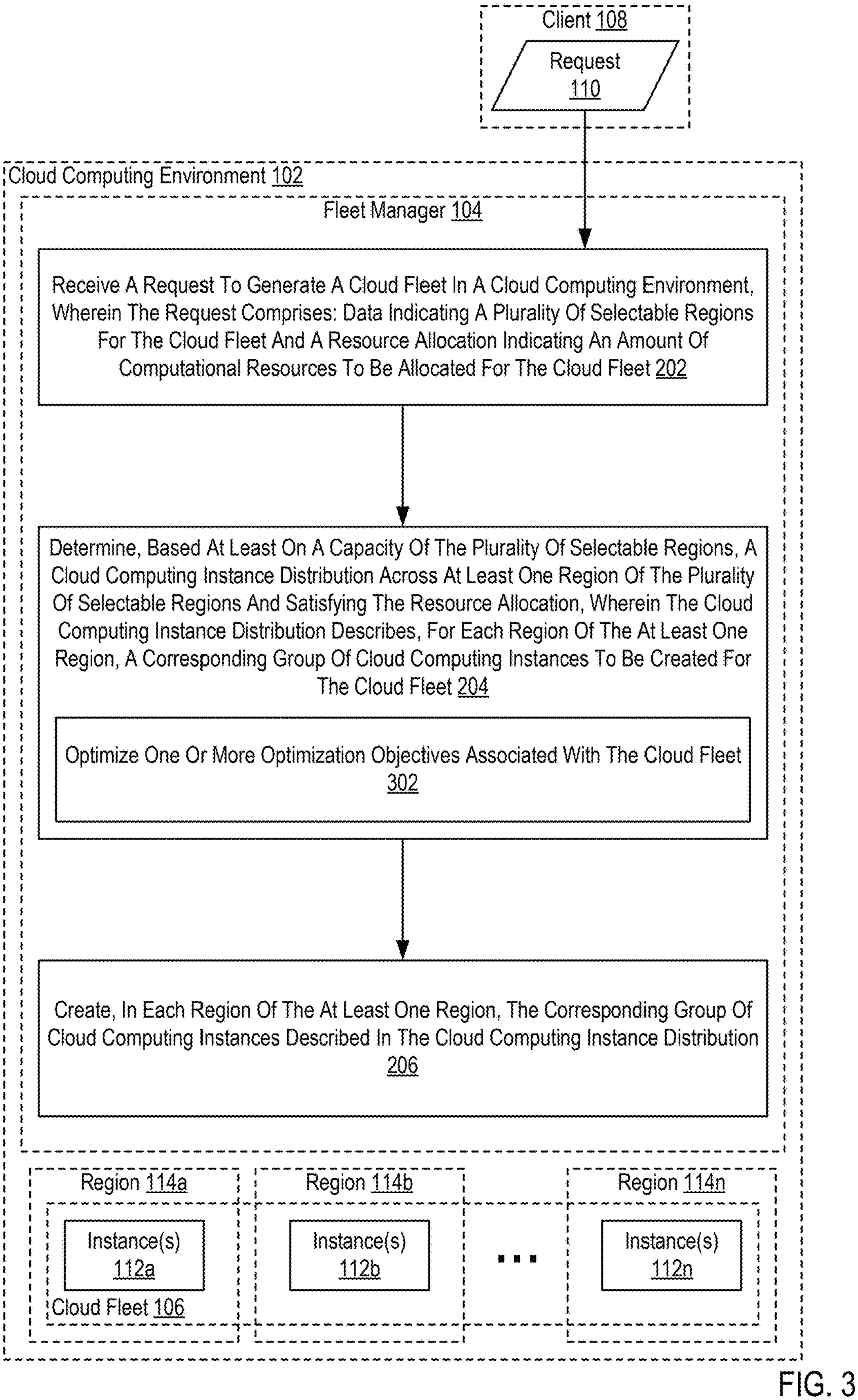
FIG. 3 sets forth a flow chart illustrating an additional example method of automatic deployment of a multi-region cloud fleet in accordance with some embodiments.

For further explanation, FIG. 3 sets forth a flowchart of another example method of automatic deployment of a multi-region cloud fleet in accordance with some embodiments of the present disclosure. In the method of FIG. 3, determining 204 the cloud computing instance 112*a,b-n* distribution also includes optimizing 302 one or more optimization objectives associated with the cloud fleet 106. As is set forth above, an optimization objective is a value (e.g., either in isolation or as a function of multiple other values) used to evaluate a cloud computing instance 112*a,b-n* distribution. Optimizing the one or more optimization objectives includes minimizing or maximizing the one or more optimization objectives. Accordingly, determining 204 the cloud computing instance 112*a,b-n* distribution includes determining 204 a cloud computing instance 112*a,b-n* distribution that both satisfies the resource allocation while maximizing or minimizing the optimization objective, and potentially satisfying other constraints or criteria as can be appreciated. For example, assuming a latency optimization objective, the cloud computing instance 112*a,b-n* distribution may include a candidate distribution that satisfies the resource allocation and has the lowest latency. As another example, assuming a throughput optimization objective, the cloud computing instance 112*a,b-n* distribution may include a candidate distribution that satisfies the resource allocation and has the highest throughput.

Figure 4:
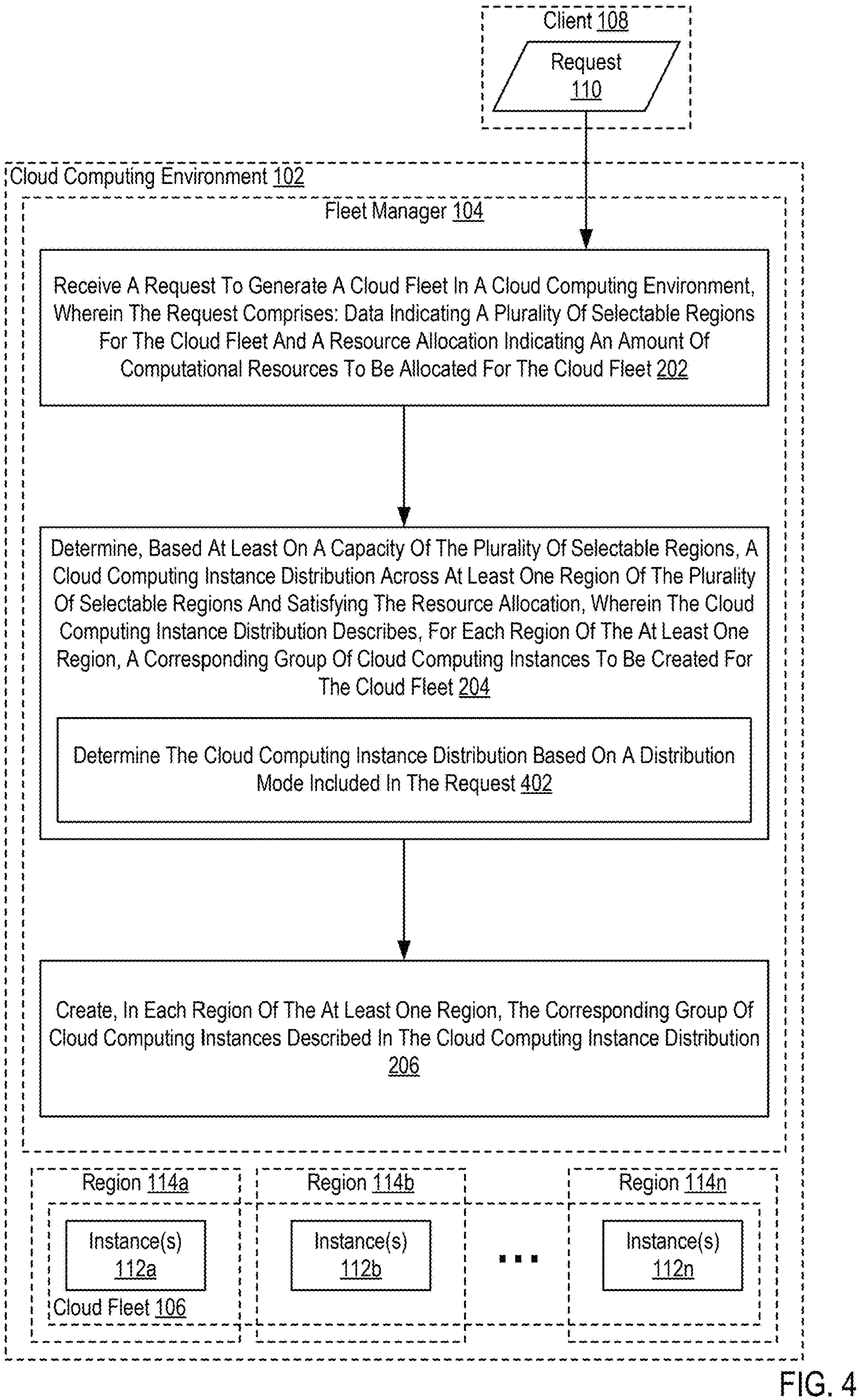
FIG. 4 sets forth a flow chart illustrating an additional example method of automatic deployment of a multi-region cloud fleet in accordance with some embodiments.

For further explanation, FIG. 4 sets forth a flowchart of another example method of automatic deployment of a multi-region cloud fleet in accordance with some embodiments of the present disclosure. In the method of FIG. 4, determining 204 the cloud computing instance 112*a,b-n* distribution also includes determining 402 the cloud computing instance 112*a,b-n* distribution based on a distribution mode included in the request 110. As is set forth above, the distribution mode describes a balance or distribution of instances 112*a,b-n* in the cloud fleet 106. For example, under a single region 114*a,b-n* mode, the cloud fleet 106 should be created in a single region 114*a,b-n* of the selectable regions 114*a,b-n* described above. As another example, under a mixed region 114*a,b-n* mode, the cloud fleet 106 can be created in multiple regions 114*a,b-n* of the selectable regions 114*a,b-n*. As a further example, under a balanced region 114*a,b-n* mode, instances 112*a,b-n* of the cloud fleet 106 should be distributed as evenly as possible across the selectable regions 114*a,b-n*.

The fleet manager 104 thus determines 402 the cloud computing instance 112*a,b-n* distribution so as to conform to the distribution mode included in the request 110. For example, assume that a user wishes to create a cloud fleet 106 using any of regions 114*a,b-n* A, B, and C, with region 114*a,b-n* A identified as a preferred region. Under a single region 114*a,b-n* mode, the fleet manager 104 will attempt to determine a distribution that satisfies the resource requirement of the cloud fleet 106 using only region 114*a,b-n* A. If this is not possible, the fleet manager 104 will then attempt to determine a distribution that satisfies the resource requirement of the cloud fleet 106 using either region 114*a,b-n* B or C. Should this not be possible, the fleet manager 104 may return an error indicating that the requested cloud fleet 106 cannot be created.

Under a mixed region 114*a,b-n* mode, the fleet manager 104 may preferentially attempt to isolate a cloud fleet 106 to a single region 114*a,b-n*. This may be due to various factors such as data ingress and egress costs associated with cross-region 114*a,b-n* communication. Returning to the example above, under a mixed region 114*a,b-n* mode, the fleet manager 104 may first attempt to determine a distribution that is isolated to any of regions 114*a,b-n* A, B, or C. Should no single-region distribution be possible, the fleet manager 104 may then consider distributions that span multiple regions 114*a,b-n*. Under a balanced region 114*a,b-n* mode, the fleet manager 104 may preferentially consider distributions with the most even balance of resources across regions 114*a,b-n*. Should no fully balanced distribution be possible, the fleet manager 104 may then consider distributions with less balanced distributions.

Figure 5:
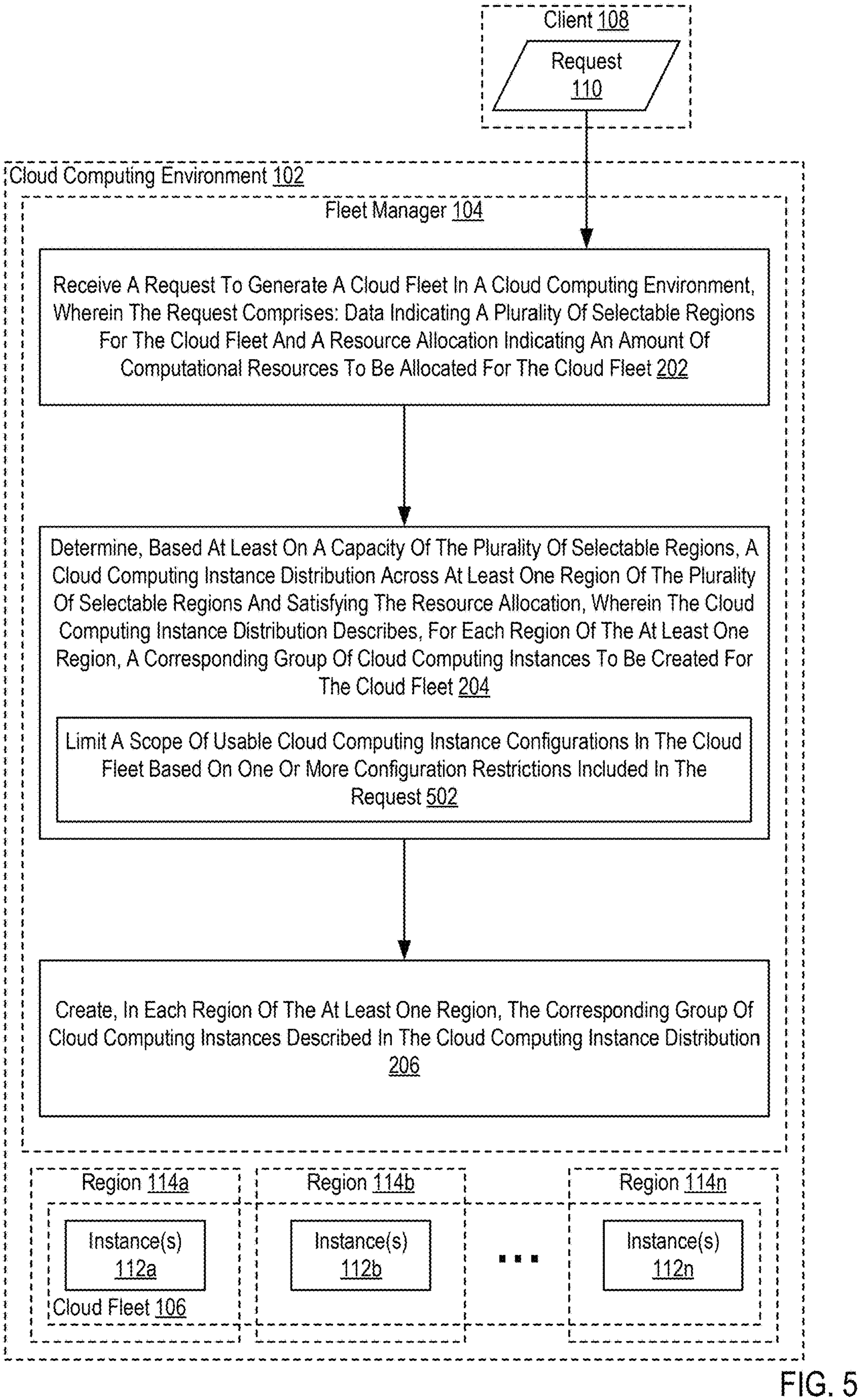
FIG. 5 sets forth a flow chart illustrating an additional example method of automatic deployment of a multi-region cloud fleet in accordance with some embodiments.

For further explanation, FIG. 5 sets forth a flowchart of another example method of automatic deployment of a multi-region cloud fleet in accordance with some embodiments of the present disclosure. In the method of FIG. 5, determining 204 the cloud computing instance 112*a,b-n* distribution also includes limiting 502 a scope of usable cloud computing instance 112*a,b-n* configurations in the cloud fleet 106 based on one or more configuration restrictions included in the request 110. As is set forth above, in some embodiments, the cloud computing environment 102 may offer various configurations of instances 112*a,b-n* each with their own hardware and/or software resources and capabilities. In some embodiments, the particular instances 112*a,b-n* of the cloud fleet 106 are selected from these different configurations.

In some embodiments, the request 110 to create the cloud fleet 106 may include configuration restrictions that limit the scope of selectable configurations by defining criteria that selectable configurations must satisfy. In other words, only those configurations that satisfy the criteria of the configuration restrictions may be selected by the fleet manager 104 for inclusion in the cloud fleet 106. In some embodiments, these configuration restrictions include a listing of selectable configurations. In some embodiments, this listing may be a ranked or unranked (e.g., ordered or unordered) listing of selectable configurations. In some embodiments, these configuration restrictions include conditions that must be satisfied by the configurations used in the cloud fleet 106. For example, in some embodiments, these configuration restrictions may include a minimum, maximum, or range of acceptable values for particular attributes of an instance 112*a,b-n* configuration. Such attributes may include a number of vCPU cores per instance 112*a,b-n*, a financial cost per instance, and the like. As another example, in some embodiments, these configuration restrictions may include particular attributes that must be present in an instance 112*a,b-n* configuration, such as particular network configurations, particular hardware or software components, and the like.

Figure 6:
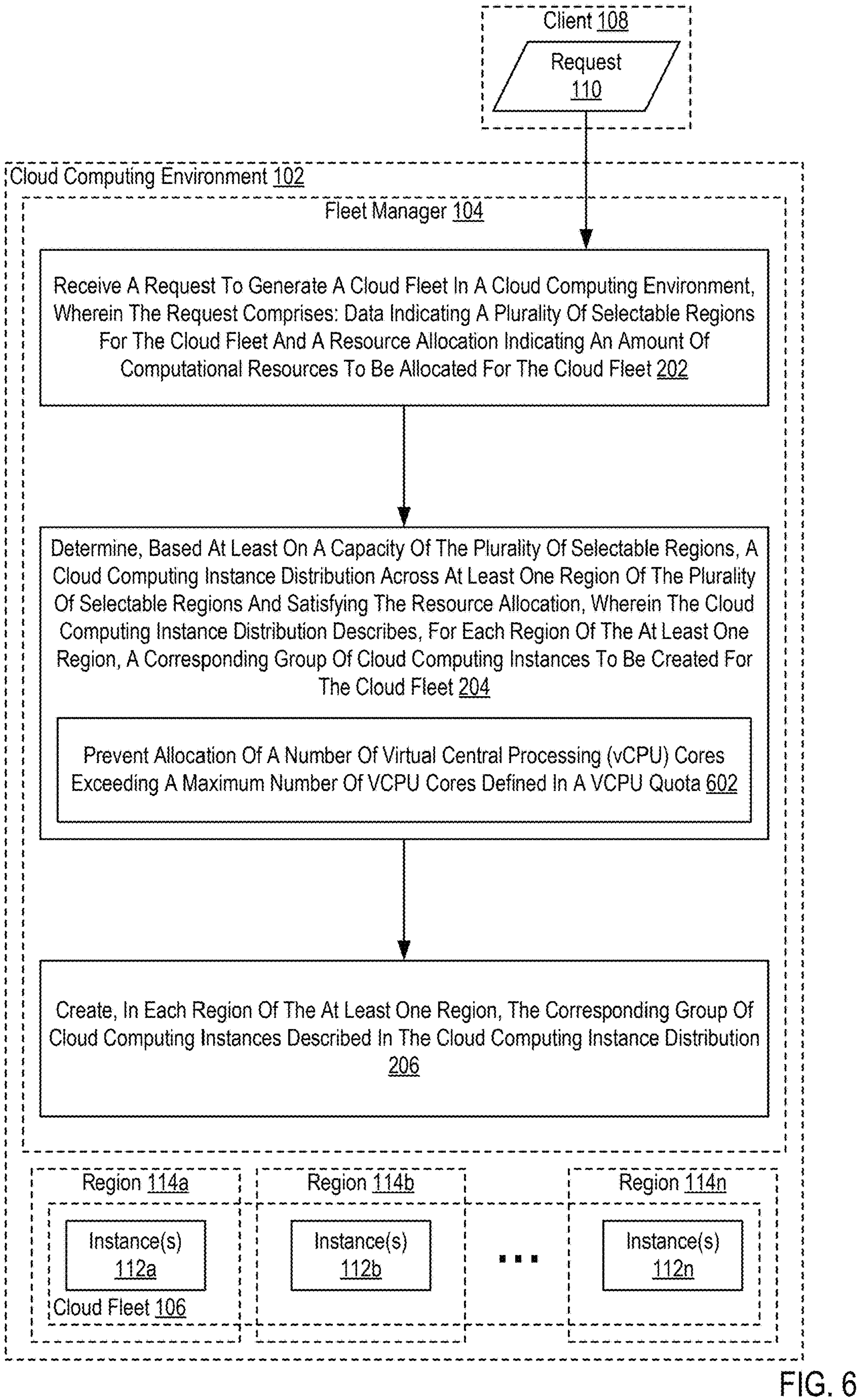
FIG. 6 sets forth a flow chart illustrating an additional example method of automatic deployment of a multi-region cloud fleet in accordance with some embodiments.

For further explanation, FIG. 6 sets forth a flowchart of another example method of automatic deployment of a multi-region cloud fleet in accordance with some embodiments of the present disclosure. In the method of FIG. 6, determining 204 the cloud computing instance 112*a,b-n* distribution also includes preventing 602 allocation of a number of virtual central processing (vCPU) cores exceeding a maximum number of vCPU cores defined in a vCPU quota. In some embodiments, a vCPU quota defines a maximum number of vCPU cores for instances 112*a,b-n* of a particular grouping of configurations. Thus, the number of vCPU cores for instances 112*a,b-n* in the grouping of configurations should not exceed the vCPU quota. In some embodiments, the vCPU quota is defined with respect to a particular region 114*a,b-n* (e.g., a regional quota) such that vCPU cores of instances 112*a,b-n* in the configuration grouping and deployed in the particular region 112*a,b-n* should not exceed the vCPU quota. In some embodiments, the vCPU quota may be defined with respect to multiple regions 114*a,b-n* (e.g., a global quota).

In some embodiments, to prevent 602 allocation of a number of vCPU cores exceeding a maximum number of vCPU cores defined in a vCPU quota, the fleet manager 104 may access information describing any applicable vCPU quotas and information describing currently allocated instances 112*a,b-n* of configuration groupings subject to a vCPU quota. The fleet manager 104 then determines the number of vCPU cores available for particular configuration groupings such that any determined distribution will not exceed a vCPU quota.

For further explanation, the sections included below provide some details regarding technologies that may be used to support automatic deployment of a multi-region cloud fleet in accordance with some embodiments. For example, FIG. 7 sets forth an example of a computing device that may be used for some portion of securing an operating system in accordance with some embodiments. As an additional example of technologies that may be used to support automatic deployment of a multi-region cloud fleet, FIG. 8 sets forth a block diagram of a cloud service provider 802 service architecture in accordance with some embodiments of the present disclosure.

Figure 7:
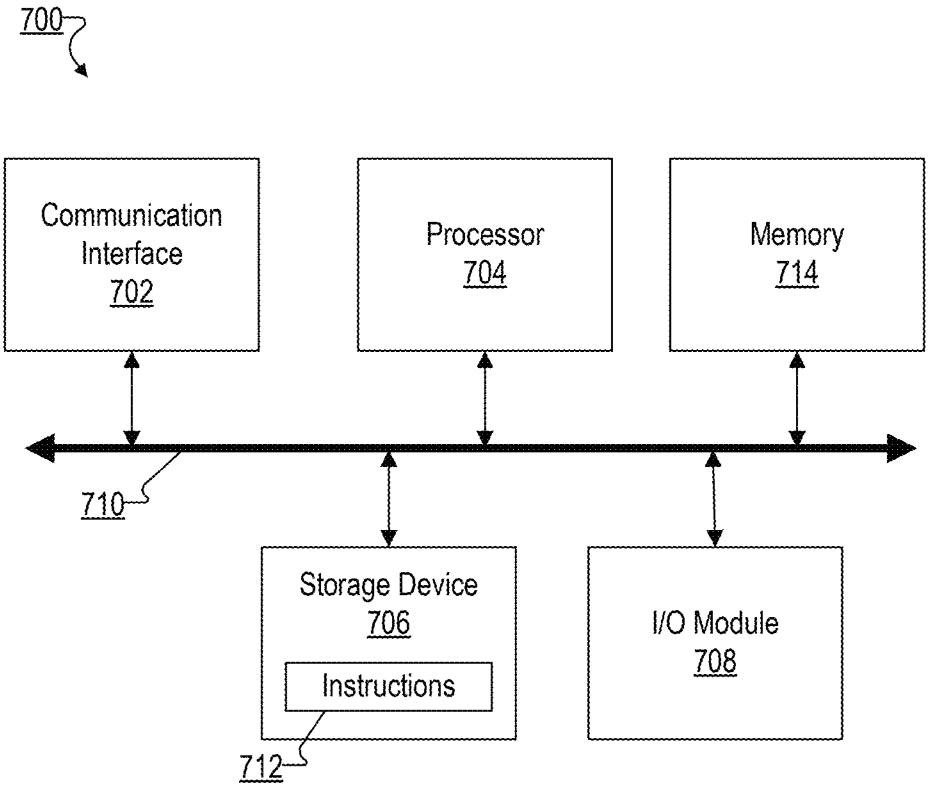
FIG. 7 illustrates an exemplary computing device that may be specifically configured to perform one or more of the processes described in the present disclosure.

For further explanation, FIG. 7 illustrates an exemplary computing device 700 that may be specifically configured to perform one or more of the processes described herein. As shown in FIG. 7, computing device 700 may include a communication interface 702, a processor 704, a storage device 706, an input/output (I/O) module 708, and computer memory 714 communicatively connected one to another via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data and/or interpreting, executing, and/or directing execution of one or more of the instructions, processes, and/or operations described herein. Processor 704 may perform operations by executing computer-executable instructions 712 (e.g., an application, software, code, and/or other executable data instance) stored in storage device 706.

Storage device 706 may include one or more data storage media, devices, or configurations and may employ any type, form, and combination of data storage media and/or device. For example, storage device 706 may include, but is not limited to, any combination of non-volatile media and/or volatile media. Electronic data, including data described herein, may be temporarily and/or permanently stored in storage device 706. For example, data representative of computer-executable instructions 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 700.

Figure 8:
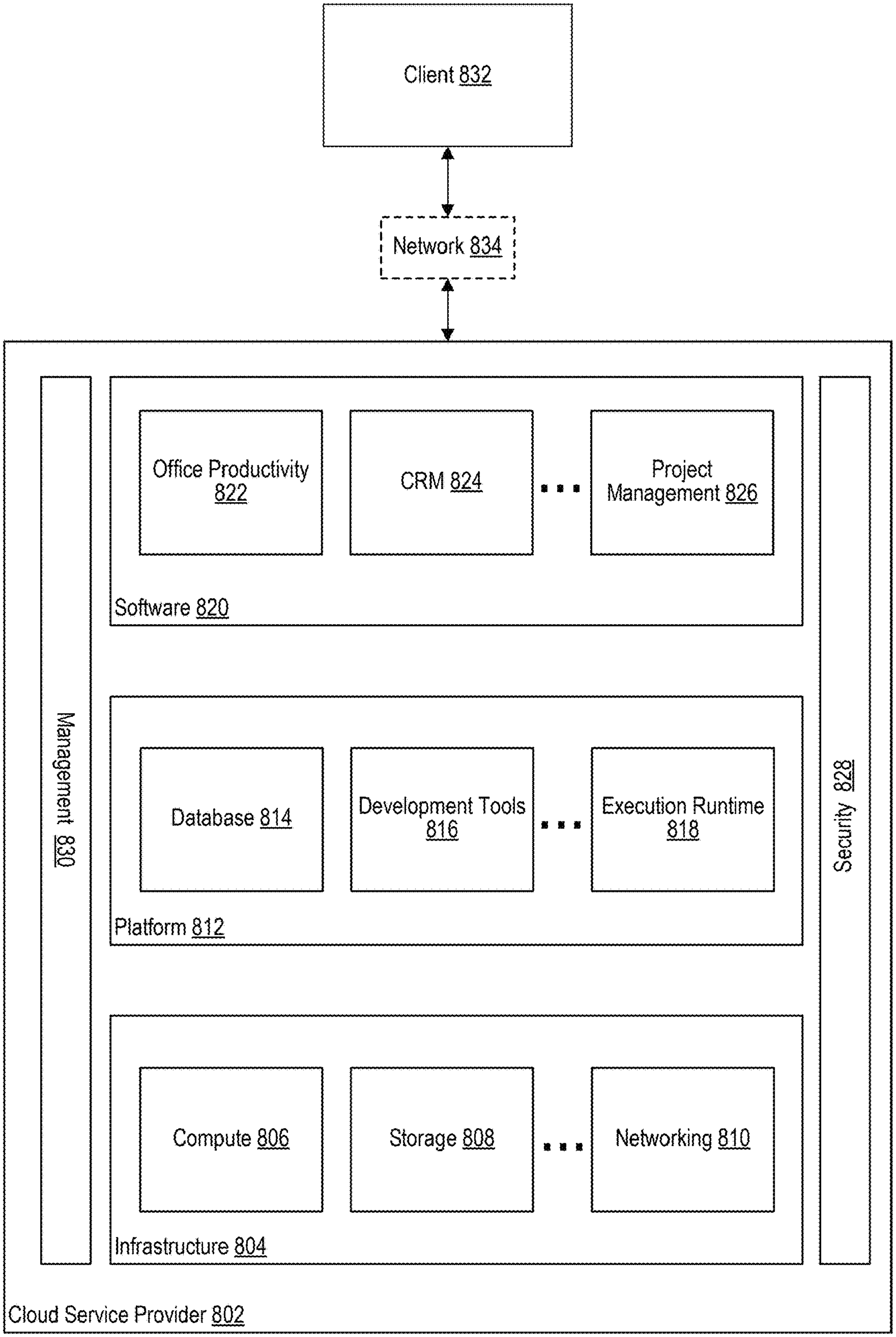
FIG. 8 sets forth a block diagram of a cloud service provider service architecture in accordance with some embodiments of the present disclosure.

For further explanation and as an additional example of a supporting technology for automatic deployment of a multi-region cloud fleet, FIG. 8 sets forth a block diagram of a cloud service provider service architecture in accordance with some embodiments. The cloud service provider 802 can deliver a variety of resources through a services-based consumption model where resources are consumed on-demand and as-a-service. Cloud service providers can provide services via cloud platforms such as, for example, Microsoft Azure™, Amazon Web Services ('AWS')™, Google Cloud Platform ('GCP')™, and others. In FIG. 8, the cloud service provider 802 is accessed from a client device 834 via a network 832.

FIG. 8 depicts an embodiment where software 820 is delivered as a service. Software-as-a-service ('SaaS') is a model where software applications are delivered over the internet as-a-service. Rather than installing and maintaining software locally, users can access software via a web browser or other network connected interface, eliminating the need for complex software and hardware management on the client-side. In FIG. 8, as examples of software 820 that can be delivered as-a-service, the illustrated embodiment includes office productivity 822 software, customer relationship management ('CRM') 824 software, and project management 826 software. The office productivity 822 software can include applications designed to facilitate common business and personal tasks, including word processing applications, applications for spreadsheet creation, presentation design applications, and many others. The CRM 824 software can include applications for managing a business organization's relationships and interactions with customers and potential customers. The project management 826 software can include applications designed to help teams plan, organize, and manage projects efficiently by facilitating collaboration and tracking the progress of projects. Readers will appreciate that in other embodiments, other types of software may be delivered using a SaaS model.

FIG. 8 depicts an embodiment where platforms 812 can be delivered as a service. Platform-as-a-service ('PaaS') is a model that provides cloud customers with platform resources that they can use to develop, run, and manage applications without the complexity of such deploying and managing such infrastructure on their own. In FIG. 8, as examples of platform 812 resources that can be delivered as-a-service, the illustrated embodiment includes database 814 services, development tools 816 services, and execution runtime 818 services. The database 814 services can be used to provide access to databases without management overhead for the user as the cloud service provider manages the provisioning, scaling, and maintenance of the databases. The development tools 816 services can provide developers with tools to design, develop, test, and deploy applications without needing to manage the underlying infrastructure. The execution runtime 818 services can provide environments where applications or other forms of computer program code can be executed, including services to scale the execution environment. Readers will appreciate that in other embodiments, other platform resources may be delivered using a PaaS model.

FIG. 8 depicts an embodiment where infrastructure 804 can be delivered as a service. Infrastructure-as-a-Service ('IaaS') is a model that provides virtualized computing resources over the internet, such that infrastructure such as servers, storage, networks, and others may be leased on demand rather than purchasing and maintaining physical hardware. In FIG. 8, as examples of infrastructure 804 resources that can be delivered as-a-service, the illustrated embodiment includes compute 806 services, storage 808 services, and networking 810 services. The compute 806 services can be used to provide on-demand access to computational resources such as VMs, containers, and serverless functions, where the cloud service provider manages the provisioning, scaling, and maintenance of such resources. The storage 808 services can provide storage resources that can be used to store and access data, without the need for customers to purchase and manage on-premises physical storage resources. The networking 810 services can provide the ability to create and manage virtualized networking resources such as, for example, virtual private networks ('VPNs'), firewalls, load balancers, and more. Readers will appreciate that in other embodiments, other infrastructure resources may be delivered using a PaaS model.

The cloud service provider of FIG. 8 also provides management 830 resources. The management 830 resources can include, for example, tools and interfaces that enable customers to efficiently deploy, monitor, and manage, their cloud services. Such tools can include web-based management consoles, command-line interfaces ('CLIs'), APIs, automation tools, and other tools.

The cloud service provider of FIG. 8 also provides security 828 resources. The security 828 resources can include, for example, tools and services to help customers protect their cloud environments and ensure compliance with security standards. These tools and services may provide specific aspects of security, including identity and access management, network security, threat detection, compliance management, and others.

Readers will appreciate that many of the components described above may be delivered as services from a cloud service provider. For example, the virtual machines, containers, and pods described above may all be delivered via a cloud service provider. In other embodiments, other forms of compute resources may be used in place of the virtual machines or other compute resource. For example, AWS EC2 instances or other form of cloud compute instances may be utilized in place of the virtual machines.

Advantages and features of the present disclosure can be further described by the following statements:

1. A method of automatic deployment of a multi-region cloud fleet, comprising: receiving a request to generate a cloud fleet in a cloud computing environment, wherein the request comprises: data indicating a plurality of selectable regions for the cloud fleet and a resource allocation indicating an amount of computational resources to be allocated for the cloud fleet; determining, based at least on a capacity of the plurality of selectable regions, a cloud computing instance distribution across at least one region of the plurality of selectable regions and satisfying the resource allocation, wherein the cloud computing instance distribution describes, for each region of the at least one region, a corresponding group of cloud computing instances to be created for the cloud fleet; and creating, in each region of the at least one region, the corresponding group of cloud computing instances described in the cloud computing instance distribution.

2. The method of statement 1, wherein determining the cloud computing instance distribution comprises optimizing one or more optimization objectives associated with the cloud fleet.
3. The method of statements 1 or 2, wherein the request further comprises a distribution mode describing a balance of cloud computing instances across the at least one region, and wherein determining the cloud computing instance distribution comprises determining the cloud computing instance distribution based on the distribution mode.
4. The method of any combination of one or more of statements 1-3, wherein the request further comprises one or more configuration restrictions, and wherein determining the cloud computing instance distribution comprises limiting a scope of usable cloud computing instance configurations in the cloud fleet based on the one or more configuration restrictions.
5. The method of any combination of one or more of statements 1-4, wherein determining the cloud computing instance distribution comprises preventing allocation of a number of virtual central processing (vCPU) cores exceeding a maximum number of vCPU cores defined in a vCPU quota.
6. The method of any combination of one or more of statements 1-5, wherein the one or more optimization objectives comprise an operating cost.
7. The method of any combination of one or more of statements 1-6, wherein the one or more optimization objectives comprise a latency.
8. The method of any combination of one or more of statements 1-7, wherein the resource allocation comprises at least one of: an on-demand instance requirement or a spot instance requirement.
9. An apparatus for automatic deployment of a multi-region cloud fleet, comprising: a memory; and one or more processing devices, operatively coupled to the memory, the one or more processing devices configured to: receive a request to generate a cloud fleet in a cloud computing environment, wherein the request comprises: data indicating a plurality of selectable regions for the cloud fleet and a resource allocation indicating an amount of computational resources to be allocated for the cloud fleet; determine, based at least on a capacity of the plurality of selectable regions, a cloud computing instance distribution across at least one region of the plurality of selectable regions and satisfying the resource allocation, wherein the cloud computing instance distribution describes, for each region of the at least one region, a corresponding group of cloud computing instances to be created for the cloud fleet; and create, in each region of the at least one region, the corresponding group of cloud computing instances described in the cloud computing instance distribution.
10. The apparatus of statement 9, wherein, to determine the cloud computing instance distribution, the one or more processing devices are further configured to optimize one or more optimization objectives associated with the cloud fleet.
11. The apparatus of statements 9 or 10, wherein the request further comprises a distribution mode describing a balance of cloud computing instances across the at least one region, and wherein, to determine the cloud computing instance distribution, the one or more processing devices are further configured to determine the cloud computing instance distribution based on the distribution mode.
12. The apparatus of any combination of one or more of statements 9-11, wherein the request further comprises one or more configuration restrictions, and wherein, to determine the cloud computing instance distribution, the one or more processing devices are further configured to limit a scope of usable cloud computing instance configurations in the cloud fleet based on the one or more configuration restrictions.
13. The apparatus of any combination of one or more of statements 9-12, wherein, to determine the cloud computing instance distribution, the one or more processing devices are further configured to prevent allocation of a number of virtual central processing (vCPU) cores exceeding a maximum number of vCPU cores defined in a vCPU quota.
14. The apparatus of any combination of one or more of statements 9-13, wherein the one or more optimization objectives comprise an operating cost.
15. The apparatus of any combination of one or more of statements 9-14, wherein the one or more optimization objectives comprise a latency.
16. The apparatus of any combination of one or more of statements 9-15, wherein the resource allocation comprises at least one of: an on-demand instance requirement or a spot instance requirement.
17. A non-transitory computer readable storage medium storing instructions which, when executed, cause a processing device to: receive a request to generate a cloud fleet in a cloud computing environment, wherein the request comprises: data indicating a plurality of selectable regions for the cloud fleet and a resource allocation indicating an amount of computational resources to be allocated for the cloud fleet; determine, based at least on a capacity of the plurality of selectable regions, a cloud computing instance distribution across at least one region of the plurality of selectable regions and satisfying the resource allocation, wherein the cloud computing instance distribution describes, for each region of the at least one region, a corresponding group of cloud computing instances to be created for the cloud fleet; and create, in each region of the at least one region, the corresponding group of cloud computing instances described in the cloud computing instance distribution.
18. The non-transitory computer readable storage medium of statement 17, wherein, to determine the cloud computing instance distribution, the instructions, when executed, further cause the processing device to optimize one or more optimization objectives associated with the cloud fleet.
19. The non-transitory computer readable storage medium of statements 17 or 18, wherein the request further comprises a distribution mode describing a balance of cloud computing instances across the at least one region, and wherein, to determine the cloud computing instance distribution the instructions, when executed, further cause the processing device to determine the cloud computing instance distribution based on the distribution mode.
20. The non-transitory computer readable storage medium of any combination of one or more of statements 17-19, wherein the request further comprises one or more configuration restrictions, and wherein, to determine the cloud computing instance distribution, the instructions, when executed, further cause the processing device to limit a scope of usable cloud computing instance configurations in the cloud fleet based on the one or more configuration restrictions.

Although some embodiments are described largely in the context of a system, method, or in some other way, readers will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

Readers will appreciate that some embodiments are described in which computer program instructions are executed on computer hardware such as, for example, one or more computer processors. Readers will appreciate that in other embodiments, computer program instructions may be executed on virtualized computer hardware (e.g., one or more virtual machines), in one or more containers, in one or more cloud computing instances (e.g., one or more AWS EC2 instances), in one or more serverless compute instances offered such as those offered by a cloud services provider, in one or more event-driven compute services such as those offered by a cloud services provider, or in some other execution environment.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method of automatic deployment of a multi-region cloud fleet, comprising:

receiving a request to generate a cloud fleet in a cloud computing environment, wherein the request comprises: data indicating a plurality of selectable regions for the cloud fleet, one or more configuration restrictions, and a resource allocation indicating an amount of computational resources to be allocated for the cloud fleet;

determining, based at least on a capacity of the plurality of selectable regions, a cloud computing instance distribution across at least one region of the plurality of selectable regions and satisfying the resource allocation, wherein the cloud computing instance distribution describes, for each region of the at least one region, a corresponding group of cloud computing instances to be created for the cloud fleet, wherein determining the cloud computing instance distribution comprises limiting a scope of usable cloud computing instance configurations in the cloud fleet based on the one or more configuration restrictions; and creating, in each region of the at least one region, the corresponding group of cloud computing instances described in the cloud computing instance distribution.

2. The method of claim 1, wherein determining the cloud computing instance distribution comprises optimizing one or more optimization objectives associated with the cloud fleet.

3. The method of claim 1, wherein the request further comprises a distribution mode describing a balance of cloud computing instances across the at least one region, and wherein determining the cloud computing instance distribution comprises determining the cloud computing instance distribution based on the distribution mode.

4. The method of claim 1, wherein determining the cloud computing instance distribution comprises preventing allocation of a number of virtual central processing (vCPU) cores exceeding a maximum number of vCPU cores defined in a vCPU quota.

5. The method of claim 2, wherein the one or more optimization objectives comprise an operating cost.

6. The method of claim 2, wherein the one or more optimization objectives comprise a latency.

7. The method of claim 1, wherein the resource allocation comprises at least one of: an on-demand instance requirement or a spot instance requirement.

8. An apparatus for automatic deployment of a multi-region cloud fleet, comprising:

a memory; and one or more processing devices coupled to the memory, the one or more processing devices configured to:

receive a request to generate a cloud fleet in a cloud computing environment, wherein the request comprises: data indicating a plurality of selectable regions for the cloud fleet, one or more configuration restrictions, and a resource allocation indicating an amount of computational resources to be allocated for the cloud fleet;

determine, based at least on a capacity of the plurality of selectable regions, a cloud computing instance distribution across at least one region of the plurality of selectable regions and satisfying the resource allocation, wherein the cloud computing instance distribution describes, for each region of the at least one region, a corresponding group of cloud computing instances to be created for the cloud fleet, wherein, to determine the cloud computing instance distribution, the one or more processing devices are configured to limit a scope of usable cloud computing instance configurations in the cloud fleet based on the one or more configuration restrictions; and create, in each region of the at least one region, the corresponding group of cloud computing instances described in the cloud computing instance distribution.

9. The apparatus of claim 8, wherein, to determine the cloud computing instance distribution, the one or more processing devices are further configured to optimize one or more optimization objectives associated with the cloud fleet.

10. The apparatus of claim 8, wherein the request further comprises a distribution mode describing a balance of cloud computing instances across the at least one region, and wherein, to determine the cloud computing instance distribution, the one or more processing devices are further configured to determine the cloud computing instance distribution based on the distribution mode.

11. The apparatus of claim 8, wherein, to determine the cloud computing instance distribution, the one or more processing devices are further configured to prevent allocation of a number of virtual central processing (vCPU) cores exceeding a maximum number of vCPU cores defined in a vCPU quota.

12. The apparatus of claim 9, wherein the one or more optimization objectives comprise an operating cost.

13. The apparatus of claim 9, wherein the one or more optimization objectives comprise a latency.

14. The apparatus of claim 9, wherein the resource allocation comprises at least one of: an on-demand instance requirement or a spot instance requirement.

15. A non-transitory computer readable storage medium storing instructions which, when executed, cause a processing device to:

receive a request to generate a cloud fleet in a cloud computing environment, wherein the request comprises: data indicating a plurality of selectable regions for the cloud fleet, one or more configuration restrictions, and a resource allocation indicating an amount of computational resources to be allocated for the cloud fleet;

determine, based at least on a capacity of the plurality of selectable regions, a cloud computing instance distribution across at least one region of the plurality of selectable regions and satisfying the resource allocation, wherein the cloud computing instance distribution describes, for each region of the at least one region, a corresponding group of cloud computing instances to be created for the cloud fleet, wherein, to determine the cloud computing instance distribution, the instructions, when executed, cause the processing device to limit a scope of usable cloud computing instance configurations in the cloud fleet based on the one or more configuration restrictions; and create, in each region of the at least one region, the corresponding group of cloud computing instances described in the cloud computing instance distribution.

16. The non-transitory computer readable storage medium of claim 15, wherein, to determine the cloud computing instance distribution, the instructions, when executed, further cause the processing device to optimize one or more optimization objectives associated with the cloud fleet.

17. The non-transitory computer readable storage medium of claim 15, wherein the request further comprises a distribution mode describing a balance of cloud computing instances across the at least one region, and wherein, to determine the cloud computing instance distribution the instructions, when executed, further cause the processing device to determine the cloud computing instance distribution based on the distribution mode.

* * * * *